United States Patent
Grate et al.

(10) Patent No.: US 10,370,072 B1
(45) Date of Patent: Aug. 6, 2019

(54) LASER MOUNTING FIXTURE

(71) Applicants: Ryan Grate, Oxnard, CA (US); Javier Esparza, Oxnard, CA (US)

(72) Inventors: Ryan Grate, Oxnard, CA (US); Javier Esparza, Oxnard, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 23 days.

(21) Appl. No.: 15/651,663

(22) Filed: Jul. 17, 2017

(51) Int. Cl.
| | |
|---|---|
| *B63B 49/00* | (2006.01) |
| *F16M 13/02* | (2006.01) |
| *F21V 17/12* | (2006.01) |
| *F21V 21/088* | (2006.01) |

(52) U.S. Cl.
CPC ............ *B63B 49/00* (2013.01); *F16M 13/022* (2013.01); *F21V 17/12* (2013.01); *F21V 21/088* (2013.01)

(58) Field of Classification Search
CPC ........ B63B 49/00; F16M 13/022; F21V 17/12; F21V 21/088
See application file for complete search history.

(56) References Cited

U.S. PATENT DOCUMENTS

| | | | | |
|---|---|---|---|---|
| 4,348,034 A | * | 9/1982 | Welt | ............................ B62B 1/12 248/168 |
| 7,789,356 B1 | * | 9/2010 | Jones | ........................ F16M 11/16 248/178.1 |
| 10,160,400 B2 | * | 12/2018 | Reichert | .................... B60R 11/04 |
| 2012/0169876 A1 | * | 7/2012 | Reichert | .................... B60R 11/04 348/148 |

* cited by examiner

*Primary Examiner* — Anita M King
(74) *Attorney, Agent, or Firm* — Charles D. Buskey; Dave A. Ghatt

(57) ABSTRACT

A fixture for mounting a laser to an extended edge, such as ship bulkhead, so that precision measurements can be made at close ranges, including over-the side situations. The fixture has a set of attached mounting plates, the first of which includes a ring assembly on which multiple types of lasers can be mounted. The fixture also has a plate with a hook and clamping mechanism to secure the fixture to the extended edge. Gussets connect the plates at an angle that helps creates a wide range of sight for the laser, as well as a secure rotational pivot point to assist with laser mounting after the fixture is attached to an edge. This fixture allows the laser operator to forgo tripods and similar fixtures which, at ground level and close quarters, allow only a limited field of view, as well as elevated, over the side situations, which are awkward and unsafe for set up and adjustment.

15 Claims, 5 Drawing Sheets

US 10,370,072 B1

LASER MOUNTING FIXTURE

STATEMENT OF GOVERNMENT INTEREST

The invention described herein may be manufactured and used by, or for the Government of the United States of America, for governmental purposes without payment of any royalties thereon or therefore.

BACKGROUND

On ships incorporating radar systems, lasers are used to improve radar alignment processes by measuring points on the radar from various angles and locations to give personnel accurate distances and three dimensional computer renderings of the radar's physical location to adjust the radar for optimal performance.

A major challenge when using laser measuring systems, on most ships, is that bulk heads and other structures create physical constraints for conventional laser mounting methods, making it more difficult to obtain measurements. The most commonly known laser mounting method is a tripod system which requires a level surface such as a deck. The challenge, however, is that most level ship deck spaces, where a tripod laser system can be set up, are a significant distance away from the radar surface which is generally located on the superstructure of the ship. As a result of this increased distance, the laser measurements are not as accurate as they would be if the laser was closer to the radar.

Additionally, as previously mentioned, many of these ship deck locations are space restricted by ship structures, such as bulk heads. These structures limit, not only the placement, but also the maneuverability of the laser and the laser mounting apparatus. This, in turn, limits the sightlines of the laser, further reducing the accuracy of measurements.

Consequently, the best vantage point for obtaining laser array measurements is, most often, from the ship decks above the radar system. Prior art FIG. 1 depicts a typical tripod laser system (100) set up on a ship's deck (105) above a radar system. To obtain measurements with a tripod system, the system has to be propped up, leaned over the deck (105) and temporarily secured with counteracting weights, glue, and/or tied off with various lengths of rope (110) as shown in prior art FIG. 1. In doing so, the tripod legs (115) and feet (120) are often resting on multiple surfaces or at different angles and heights on the same surface. These types of setups are awkward and unstable and put the laser system in jeopardy of being jostled or slipping out of position and being damaged from the impact of hitting the ship's structure. Additionally, all or a part of the laser system can be dislodged and fall to the deck below causing harm to personnel. Moreover, the restrictions of this tripod and similar setups limit the maneuverability and the level of adjustments that can be made to the laser, further reducing the laser's optimal sight lines for the most accurate measurements.

Therefore, a safer, more reliable laser mounting system is needed to measure radar surfaces on ships and other areas with restrictive spaces and structures from the best possible vantage point.

SUMMARY

The invention is a laser mount fixture that eliminates the need for bulky, unstable tripod systems when measuring points on a radar system for alignment on ships, or any other situation where there are bulkheads, overhangs, or other partitions that prohibit or limit traditional laser mounted access and lines of sight. This fixture easily mounts to bulkheads or partitions and provides a safe and reliable means to obtain laser measurement in areas requiring steep look angles. The device is secured to the deck-edge, bulkhead, or partition and a laser tracker or other precision laser instrument is mounted to it.

The laser mount fixture has a mounting plate, which has a front face, a back face, a front end and a back end. A universal mounting ring, for attaching a laser tracker or similar device, is secured to the front face of the mounting plate. A back plate, also having a front face, a back face, a front end and a back end, is secured to the mounting plate, at an angle, using two gussets. Both gussets secure the back face on the back end of the mounting plate to the front face on the front end of the back plate. The gussets are separated by a distance that provides a stable connection between the mounting plate and the back plate.

The laser mount fixture also has a bulk head plate which has a front face a back face, a top edge and a bottom edge. The top edge of the bulk head plate is secured to the back face on the back end of the back plate. The back face of the bulk head plate has a bulkhead receiver with a fastener for receiving the bulkhead and securing the mounting fixture to the bulkhead.

The portability of the fixture and ease at which it can be mounted to bulkheads and other platforms makes it safer and more reliable to use in elevated over-the-side and other inaccessible situations to achieve precision laser measurements at close ranges. The mounting ring accommodates a variety of lasers mounts and the fixture's mounting plates can be modified to fit in confined spaces and achieve angles that optimize laser accuracy.

DRAWINGS

DETAILED DESCRIPTION

Figure 1:
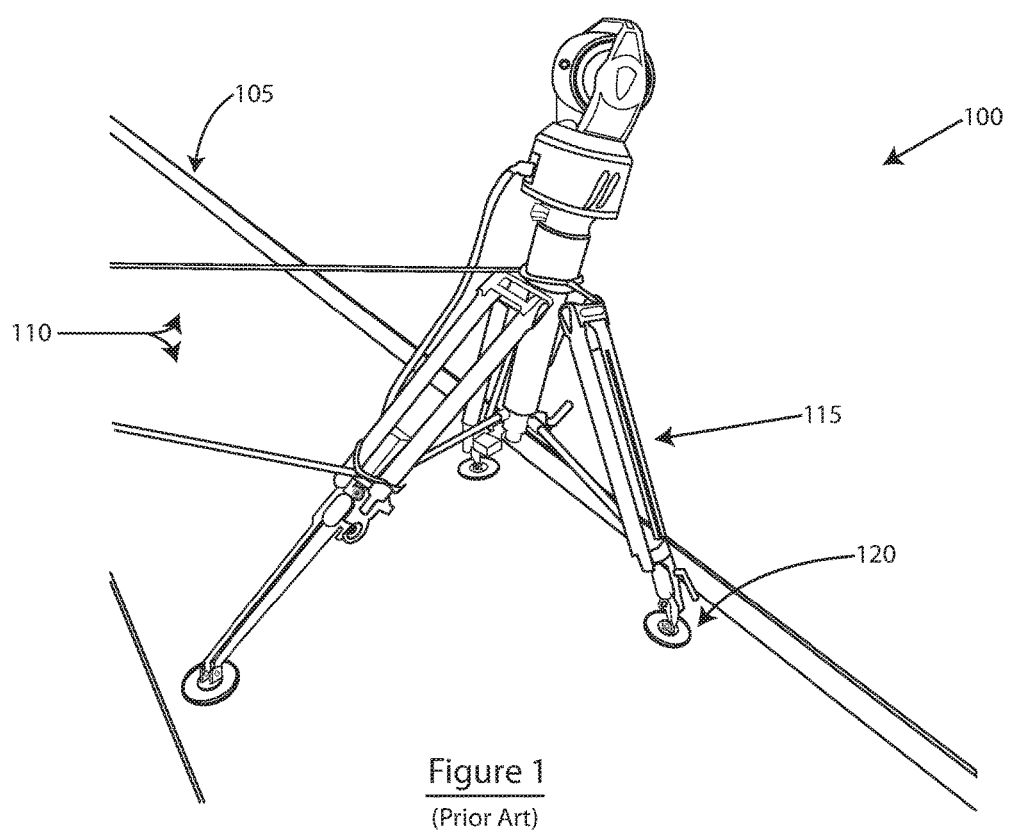
FIG. 1 (Prior Art) is a typical tripod laser set up used to mount a laser to a bulk head for overhead measurements.
Figure 2:
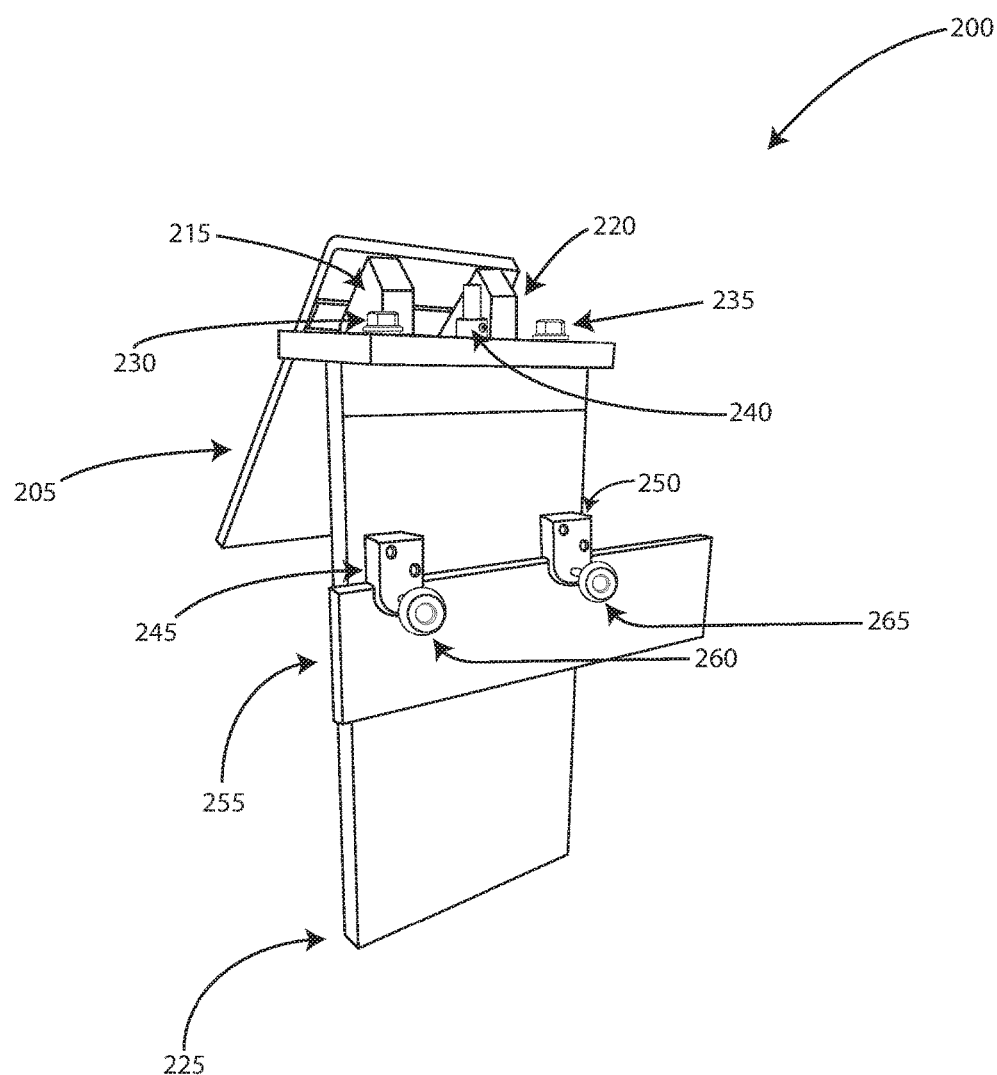
FIG. 2 is a rear view of the preferred embodiment of the laser mount fixture.

FIG. 2 is a rear view of the preferred embodiment of the laser mount fixture (200). The fixture (200) has a laser mounting plate (205). The laser mounting plate is secured, at an angle, to a back plate (210) by gussets (215) and (220). The back plate (210) is secured to a bulk head plate (225) by two traditional bolts (230) and (235), and a swivel bolt (240) in between the traditional bolts (230) and (235).

The three bolts (230), (235), and (240) connect the back end of the back plate (210) to an end of the bulkhead plate (225). A first standard bolt (230) is installed toward one side of the back end of the back plate (210) and a second standard bolt (235) is installed toward the opposite side of the back end of the back plate (210). Both bolts are installed through the top face of the back plate (210) into the end of the bulk head plate (225). The third bolt (240) is a swivel bolt installed in between the first (230) and second (235) standard bolts, toward the middle and on the back end, of the back plate (210). Installing the swivel bolt (240), by itself, allows the back plate (210), gussets (220 and 230), and mounting plate (205) to be rotated as a unit around the bulkhead plate (225). This facilitates safe installation of the laser to the face of the mounting plate (205). That is, after securing the bulk head plate (225) to a bulk head (255), the operator can rotate the mounting plate (205) around the swivel bolt (240) to a position that allows them to easily install the laser, reducing the likelihood that the laser will be damaged during the installation.

Attached to the backside of the bulkhead plate (225) are two hook and clamp receivers (245) and (250) which receive and secure the fixture to the bulk head (255) or other partition. Each receiving hook is machined or welded to the backside of the bulkhead plate (225) and has a hole for receiving a clamp or bolt for tightening the bulkhead plate into place on the bulkhead. In the preferred embodiment shown in FIG. 2, two receivers (245) and (250) are installed on the backside face of the bulkhead (255). However, in alternate embodiments multiple receivers or a single receiver can be used to achieve the desired, secure connection to the bulkhead (225). In the preferred embodiment, the receivers (245) and (250) are of a hook and clamp variety. However, other types of receivers can be used to the extent they have a means for receiving the bulkhead (255) and securing the fixture (200) to it. The bulkhead or deck edge (255) slides into the hooks of the receivers and bolts or clamps (260) and (265) tighten onto the bulk head to secure it in place.

Figure 3:
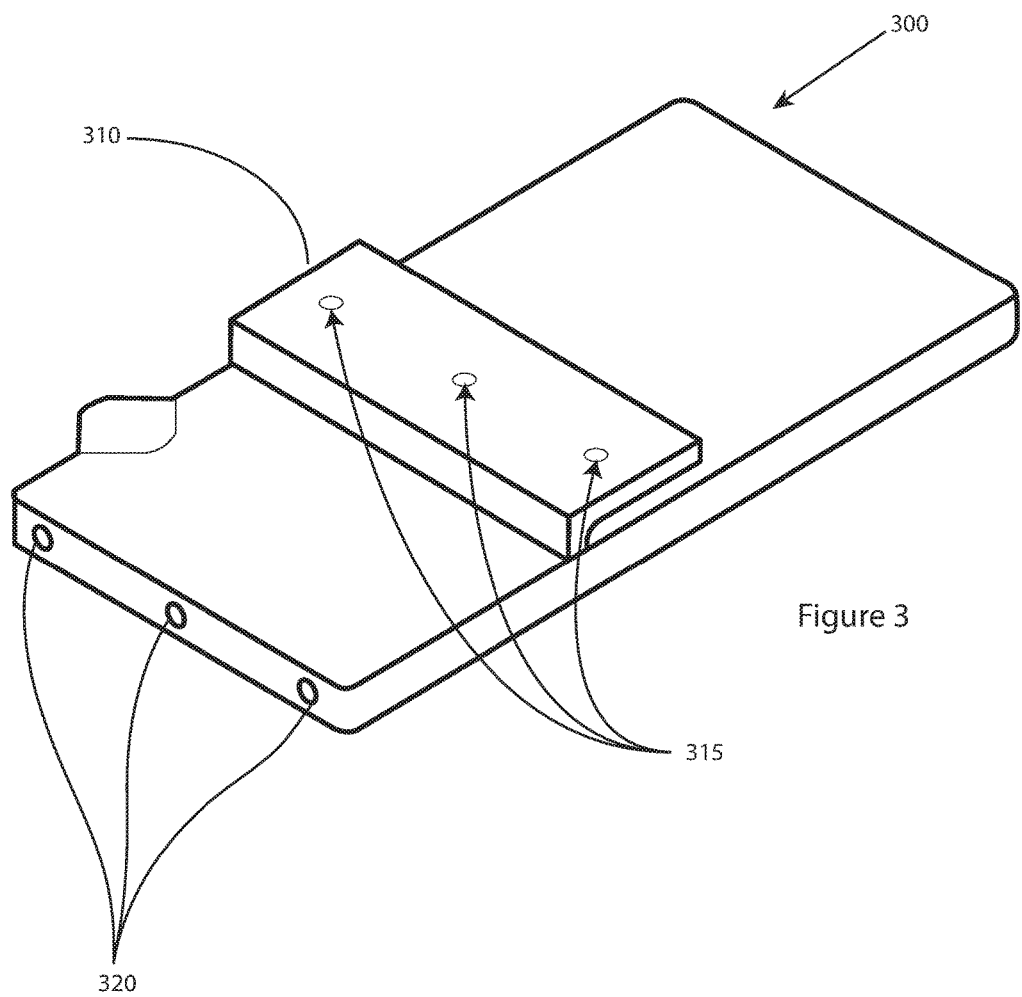
FIG. 3 is a rear view of an alternate embodiment of the bulkhead plate of the laser mount fixture.

FIG. 3 shows a close up view of an alternate embodiment of the bulkhead plate (300). Instead of two or more hook and clamp receivers, this embodiment has one receiver (310) that spans the length of the bulkhead plate (300). In other alternate embodiments, the receiver can be longer or shorter than the length of the bulkhead plate (300). The bulk head receiver (310) includes multiple machined holes (315) to received bolts that tighten to secure the bulk head plate (300) in place on the bulkhead. FIG. 3 also shows the top end of the bulk head plate (300) where it will be connected to the back plate. The top end of the bulk head plate (300) includes three machined holes (320) to receive the two standard bolts on either end, and the one swivel bolt in the middle as discussed above with reference to FIG. 2.

Figure 4:
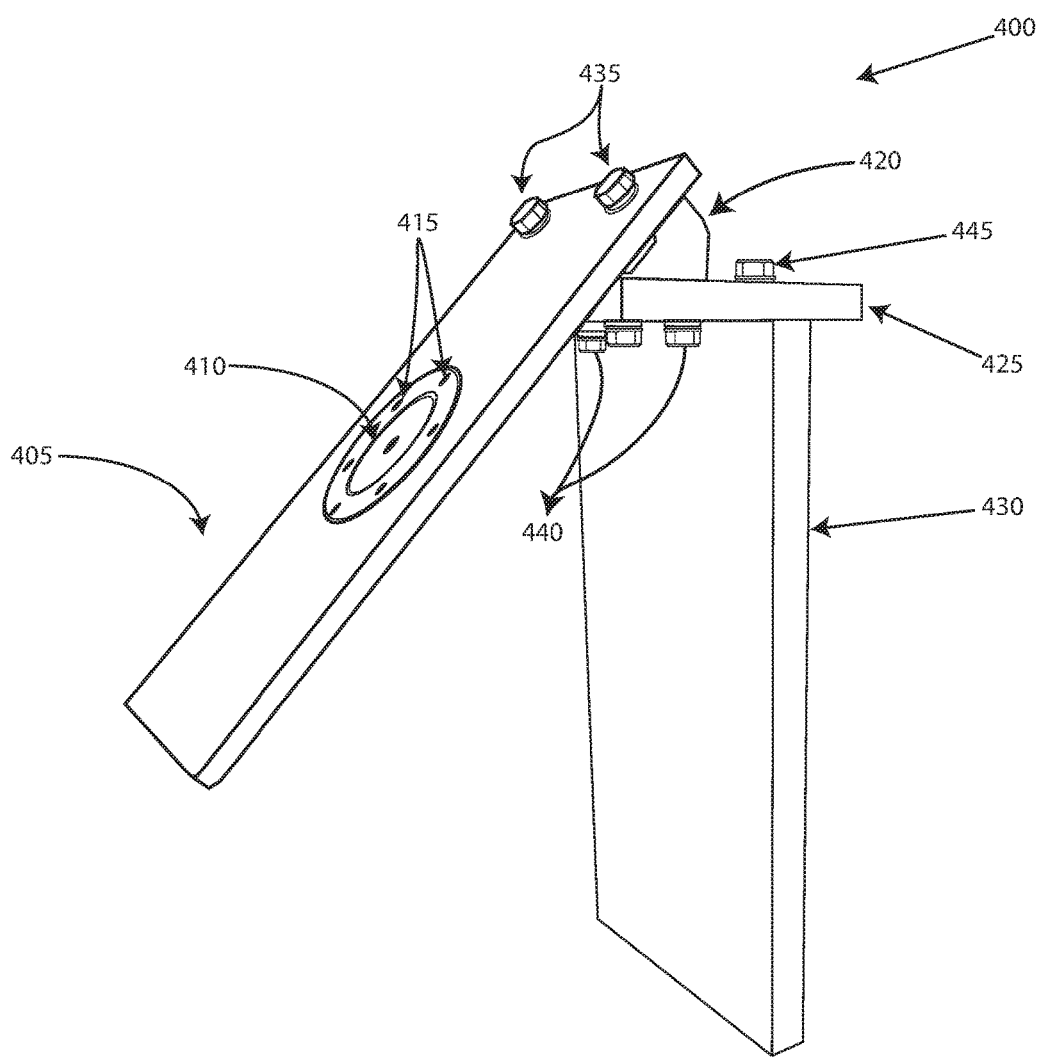
FIG. 4 is side view of the preferred embodiment of the laser mount fixture.

FIG. 4 is a side view of the preferred embodiment of the laser mount fixture (400). The front side of the mounting plate (405) is visible showing the laser mounting ring (410). The face of the mounting plate (405) is machined to accommodate the mounting ring (410) so that the surface of the mounting ring (410) is flush against with the face of the mounting plate (405). The mounting ring (410) includes multifunctional threaded through holes (415). Some of the threaded holes (415) are countersunk to secure the mounting ring (410) to the front face of the mounting plate (405). The remaining threaded holes (415) accommodate screws and fasteners for the laser's mounting hardware. The countersunk screws facilitate the mounting ring (410) to setting flush with the face of the mounting plate (405) so that a laser fixture can be mounted level against the surface face of the mounting plate (405). The mounting ring (410) can receive various types of laser mounts as well as adaptors for mounting other types of equipment. Moreover, in alternate embodiments the face of the mounting plate (405) can be machined to accommodate mounts of various types, shapes and sizes.

The mounting plate (405) is secured, at an angle, to the back plate (425) with gussets (420) installed between the mounting plate (405) and back plate (425). The gussets (420) create the angle between mounting plate (405) and the bulkhead plate (430). In the preferred embodiment this angle is 45 degrees to optimize the look angle from the laser on the mounting plate when the mount device is installed on an overhanging ship deck or bulkhead. However, in alternate embodiments of the invention, the gussets (420) can be designed to create smaller or larger angles between the mounting plate (405) and the bulkhead plate (430) to accommodate other desired look angles, or various types of mounting situations. The gussets (420) attach the back side end of the mounting plate (405) to the front side end of the back plate (425). The gussets (420) are secured in place with bolts (435) installed through the front side end of the mounting plate (405) and bolts (440) through the back side end of the back plate (425). The bolts (435) and (440) allow the interchanging of different sized gussets (420) for the alternate embodiments discussed above.

Figure 5:
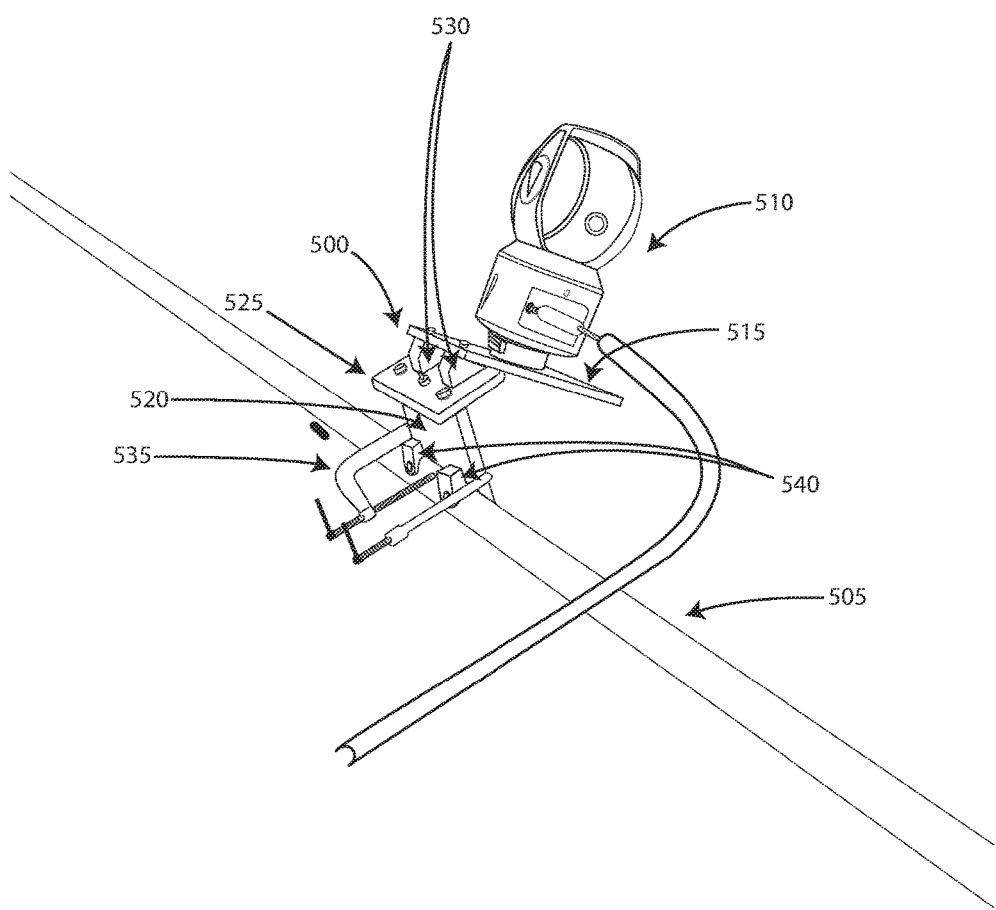
FIG. 5 is a view of the preferred embodiment of the laser mount fixture installed on a bulkhead.

FIG. 5 shows the preferred embodiment of the laser mount fixture (500) installed on a bulkhead (505). A laser unit (510) is secured to the front face of the mounting plate (515). It can be seen, from this view, that the laser mount fixture provides a safe and reliable means to achieve a step look angle laser measurements form an overhanging vantage point. The angle between the mounting plate (515) and the bulk head plate (520) achieved with the gussets (530), coupled with the distance between the mounting plate (515) and the bulk head plate (520) achieved with the back plate (525), allows the laser unit (510) to be extended out and over the edge of the bulk head to provide a clear line of site to the areas below and above. Because the bulk head plate (520) can sit flush against the bulk head, additional clamps (535) can easily be installed, to supplement the hook and bolt receivers (540) to further secure the fixture in place.

In the preferred embodiment, 6061 aluminum is used to manufacture the plates of the laser mount fixture. 6061 aluminum reduces the weight of the fixture so that it can easily be transported and installed on the bulk head, while being sturdy enough to support the weight of lasers and similar equipment while secured to and extending over the bulkhead. In alternate embodiments, other materials can be used.

Although the invention has been described in detail with reference to preferred embodiments, other embodiments can achieve the same results. Variations and modifications of the present invention will be obvious to those skilled in the art and this specification and appended claims is intended to cover all such modifications and equivalents. The entire disclosure and all references, applications, patents and publications cited above are hereby incorporated by reference.

What is claimed is:

1. A fixture for mounting a laser to a bulkhead comprising:
a mounting plate having a front face, a back face, a front end and a back end;
a mounting ring secured to the front face of the mounting plate;
a back plate with a front face a back face, a front end and a back end;
a first gusset that secures the back face, on the back end, of the mounting plate to the front face, on the front end, of the back plate;
a second gusset that secures the back face, on the back end, of the mounting plate to the front face, on the front end, of the back plate; and
a bulk head plate having a front face a back face, a top edge and a bottom edge,
wherein the top edge of the bulk head plate is secured to the back face, on the back end, of the back plate, and wherein the back face of the bulk head plate comprises receivers with fasteners for receiving the bulkhead and fastening the bulkhead plate to the bulkhead.

2. The fixture of claim 1, wherein the first gusset and the second gusset are secured to the back face, on the back end, of the mounting plate with bolls inserted through the front face of the mounting plate.

3. The fixture of claim 1, wherein the first gusset and the second gusset are secured to the front face, on the front end, of the back plate with bolts inserted through the back face of the back plate.

4. The fixture of claim 1, where the first gusset and the second gusset are welded to the mounting plate and the back plate.

5. The fixture of claim 1, wherein the bulkhead plate receivers are comprised of hooks with clamps, wherein the hooks receive the bulk head and the clamps secure the bulkhead plate to the bulkhead.

6. The fixture of claim 1, wherein the first gusset and the second gusset create a 45 degree angle between the mounting plate and the bulk head plate.

7. The fixture of claim 1, wherein the hulk head plate is secured to the back plate by two standard bolts and a swivel bolt between the two standard bolts.

8. The fixture of claim 7, wherein the front face on the back end of the back plate comprises three drilled holes and wherein the top edge of the bulk head plate comprises three drilled holes to receive the two standard bolts and swivel bolt through the front face on the back end of the back plate.

9. The fixture of claim 7, wherein the swivel bolt is positioned so that when it is solely employed to secure the bulkhead plate to the back plate, the mounting plate and the back plate, as a unit, can swivel around the bulkhead plate to facilitate laser mounting on the mounting plate.

10. The fixture of claim 1, wherein the mounting plate is machine to receive the mounting ring so that the mounting ring, when installed, is flush against the front face of the mounting plate.

11. The fixture of claim 1, wherein the mounting ring is secured to the front face of mounting plate with countersunk screws.

12. The fixture of claim 1, wherein mounting ring comprises hard ware for mounting various types equipment.

13. The mounting fixture of claim 1, wherein the fixture is constructed of 6061 aluminum.

14. A fixture for mounting a laser to a bulkhead comprising:
a mounting plate having a front face, a back face, a front end and a back end; a mounting ring secured to the front face of the mounting plate;
a back plate with a front face a back face, a front end and a back end;
a first gusset that secures the back face, on the back end, of the mounting plate to the front face, on the front end, of the back plate;
a second gusset that secures the back face, on the back end, of the mounting plate to the front face, on the front end, of the back plate;
a bulk head plate having a front face a back face, a top edge and a bottom edge, wherein the top edge of the bulk head plate is secured to the back face, on the back end, of the back plate, and wherein the back face of the bulk head plate comprises a receiver for receiving the bulkhead and a fastener for securing the bulkhead plate in place on the bulkhead.

15. The fixture of claim 14, wherein the receiver is a hook that is a length of the bulk head plate and comprises holes for receiving fastening bolts to secure the bulkhead plate to the bulkhead.

\* \* \* \* \*